UNITED STATES PATENT OFFICE

2,144,906

FLAVORING MATTERS AND THEIR APPLICATION

Hein Israel Waterman, Delft, and Cornelus van Vlodrop, Rotterdam, Netherlands, assignors to Imperial Chemical Industries Limited, a corporation of Great Britain No Drawing. Application December 11, 1934, Serial No. 757,064. In the Netherlands December 16, 1933

13 Claims. (Cl. 99—140)

This invention relates to flavoring matters and their application; and it comprises a method of producing, from butter fat, concentrated oily preparations containing a high proportion of the flavor-imparting and vitamin constituents of butter, which comprises freeing butter fat of water and advantageously also of gases or vapors and subjecting it to evaporative distillation under conditions of short path and high vacuum at a temperature sufficient to distil out a desired fraction containing most of said desirable constituents without ebullition taking place and without causing substantial decomposition of the fat or the vitamin content thereof; and it further comprises the product of such process, the product being characterized as an oil containing in concentrated form substantially all the flavor-imparting and vitamin constituents of a batch of butter fat of substantially greater weight, being free from all matter non-volatile under the conditions of evaporative distillation and being freely miscible with edible fats derived from sources other than butter, the product being useful as such or in admixture with such fats, to replace butter in cooking while being equivalent thereto as regards vitamin content and the property of developing the characteristic butter flavor on cooking; all as more fully hereinafter set forth and as claimed.

It is known that the delicate yet rich taste of many foods and luxury confections made with butter, especially bakery products such as biscuits, cakes, cookies and the like, is principally due to a butter flavor developed de novo on cooking. It is also known that the vitamins contained in the butter and existing in the cooked food impart to these food products a high nutriment value. In spite of many attempts to provide substitutes, butter remains the best shortening, flavoring and nutriment-imparting agent for foods.

One object of this invention is to provide concentrated flavor-imparting preparations for cooking, capable, when used in small amounts, of producing in bakery products the same excellent qualities of taste and nutritive value as are produced by the use of butter itself. A further object is to produce such flavoring matters from butter fat, while leaving a valuable fatty residue. Another object is to provide new preparations comprising such concentrated preparations in admixture with a fat derived from a source other than butter.

These and other objects are achieved according to the invention by subjecting water-free butter fat to evaporative fractional distillation under high vacuum (0.1 mm. or less) and short path conditions at a suitable temperature so as to extract and recover desirable constituents in concentrated form while avoiding any substantial decomposition of the fat or destruction of its vitamin content.

The following is an example of one specific embodiment of the invention:

Example

Butter is melted and the fat, separated from the water, is dried, the last traces of water being removed in a vacuum. The fat so obtained is semi-solid at about 20° C. This fat is melted in a degassing chamber maintained at the same high vacuum (about 0.001 mm. of mercury) as is to be used for distillation, and from this chamber it is allowed to flow in a thin film over a heated surface. This heated surface is conveniently the outer surface of a vertical tube, the top end of which is closed and rounded so as to act as a distributor. The tube is heated electrically by means of a wire spiral placed inside it, the heating being controlled so that it does not exceed about 240° C. The heated tube is surrounded at a distance of an inch or less by a condensing surface, suitably cooled, the space between the heated surface and the condenser surface being maintained at very high vacuum, namely 0.001 mm. of mercury. Under these conditions the fat undergoes what may be termed "molecular distillation"; i. e. the fat does not boil, but molecules leaving the surface have so short a path to travel to the condensing surface and are so unobstructed owing to the high vacuum that relatively few of them return to the molten fat, the great majority of such molecules being caught by the condenser surface, where they lose much of their kinetic energy; or in other words, they condense.

Our copending application Serial No. 723,992, filed May 4, 1934, discloses an apparatus for evaporative or molecular distillation which is well suited for carrying out the present process.

There is so obtained a distillate and a residue. The distillate forms about 30 per cent of the butter fat used, and is an oil which deposits a small amount of solid on standing. The undistilled residue forms about 70 per cent of the butter fat, and becomes solid on standing.

The distillate contains a much higher proportion of vitamin A than the original butter fat (as shown by the Carr and Price reaction). It has the characteristic smell and taste of butter, and can be used together with the necessary amount of shortening fat (lard or other non-butter fat) without butter in the preparation of high class bakery products and luxury confections, to which it imparts the same taste and nutritive value as a very much larger proportion of butter. It is often convenient to produce an extract containing the essential flavor-imparting and vitamin content of twice or thrice its weight of butter fat.

The residue is a pure fat suitable for use in the margarine and other industries. It is an excellent shortening agent.

The new flavoring matter is employed in the production of bakery products by adding it, together with lard, margarine or other non-butter fat, in place of a corresponding quantity of butter. Thus the flavoring matter obtained according to the above example may be mixed with 2.3 times its weight of lard and used in substitution for 3.3 parts by weight of butter. Typical useful preparations can be made by admixing the non-butter fat with a concentrate containing the essential flavor-imparting and vitamin content of twice or thrice its weight of butter fat. If the distillation is so conducted that the flavoring and vitamin content of the butter fat are collected in a distillate which is say 10 per cent of the starting material, a proportionately larger amount of lard or other non-butter fat may be used, e. g. 10 parts by weight to 1 part of the new preparation.

It is further possible according to the invention to provide preparations having a standardized concentration of flavoring matter and/or vitamin. Thus, the distillate from a large-scale operation may be diluted with some of the pure fat residue, or a high-strength concentrate from a previous distillation may be added to it, according as the concentration of flavoring and/or of vitamin is found by test to be above or below the desired standard strength. A suitable standard strength is that obtained by working according to the above example, i. e. about 3.3 times as concentrated as butter fat itself. Other standard strengths may of course be chosen according to market requirements. A strength of 10 times that of butter fat is quite readily obtained. For higher concentrations it may be necessary to repeat the distillation, i. e. to redistil the distillate under similar conditions.

It will be understood that the invention is not limited as regards practical details to the above example, but permits of many variations therefrom. The essential principle is a separation of butter fat into fractions by a short-path distillation in high vacuum at a temperature sufficient to distil the desired fraction but insufficient to cause decomposition of the desired constituents, the distillate constituting the new flavoring matter containing the bulk of the vitamin and flavoring content of the original butter fat.

The proportion of fat distilling may be varied according to the concentration of flavoring matter desired. It may be much higher than 30 per cent (for low concentrations of flavoring matter) or much lower than 30 per cent (for high concentrations). The temperature may vary considerably, though 180–240° C. is a convenient range, but must of course be below the decomposition point of the butter fat and of its vitamin and/or flavoring content. Pressures of the order of the cathode ray vacuum are preferably employed, but pressures up to about 0.1 mm. may be used if desired. Distillation is of course much slower at 0.1 mm. than at 0.001 mm.

The apparatus may be any still which is capable of being worked at these high vacua, and in which the path to be traversed by the distilling molecules from the heated surface to the condensing surface is relatively short, namely of the order of one inch or less. However, as stated, the apparatus described in our copending application is especially good. The distillation is always "evaporative", i. e. without ebullition, and becomes "molecular" when the path to be traversed by the distilling molecules is of the order of the mean free path of the molecules at the temperature used.

The still may be equipped with devices for collecting the distillate in a series of fractions, and a standard product may be produced by blending fractions richer in flavoring and/or vitamin with poorer fractions.

As many varied and apparently widely different embodiments of this invention may be made without departing from the spirit and scope thereof, it is to be understood that we do not limit ourselves to the specific embodiments thereof, except as defined in the appended claims.

We claim:

1. Process for the manufacture of new concentrated flavoring preparations for use to replace butter in cooking which comprises subjecting water-free butter fat to evaporative short path distillation under high vacuum at such a temperature that a fraction is distilled off but below a temperature at which decomposition of the fat occurs, and recovering this fraction, while the fat is not decomposed to any substantial extent and no boiling takes place, the fraction containing in concentrated form the flavor-imparting and vitamin content of the fat.

2. Process for the manufacture from butter fat of new concentrated oily flavoring preparations for use to replace butter in cooking which comprises subjecting butter fat free from water to evaporative short-path distillation under a vacuum of the order of 0.001 to 0.1 mm. of mercury at a temperature less than 240° C. and recovering a distillate in the form of an oil containing in concentrated form the flavor-imparting and vitamin content of the fat.

3. Process according to claim 1 in which the path length is sufficiently short and the degree of vacuum is sufficiently high to provide molecular distillation conditions.

4. Process of claim 1 in which the distillate is collected in a series of separate fractions, the lower melting point fractions containing higher proportion of flavor-imparting constituents and vitamins.

5. Process for the manufacture of a new concentrated flavoring preparation for use in cooking which comprises subjecting water-free butter fat to evaporative short-path distillation under high vacuum at such a temperature as to distil off a fraction equal to not more than one-third of the weight of the butter fat, the temperature being low enough so that the fat is not decomposed and no boiling takes place, and recovering the distilled fraction as an oil containing in concentrated form the flavor-imparting and vitamin content of the fat.

6. Process for the manufacture of new concentrated flavoring preparations for use in cooking to replace butter which comprises freeing butter fat of water, subjecting it in melted condition to high vacuum to degas it and subjecting it to evaporative short-path distillation under high vacuum at such temperature, below the decomposition temperature of the fat, that a fraction is distilled off, and recovering such fraction, the fat not being substantially decomposed and no boiling taking place, the fraction containing in concentrated form the flavor-imparting and vitamin content of the fat.

7. A new flavor-imparting preparation in the form of an oil containing natural butter flavor-imparting constituents and vitamin constituents equivalent to those in at least twice its weight of raw butter fat and being free of matter non-volatile under conditions of evaporative distillation.

8. A new concentrated flavoring preparation in the form of an oil containing an essential natural flavor-imparting and vitamin content equivalent to that in at least three times its weight of butter fat and being free of matter non-volatile at temperatures of the order of 180 to 240° C. and vacua less than 0.1 millimeter.

9. A preparation for use in cooking to replace butter comprising a mixture of a major proportion of an edible non-butter fat and a minor proportion of a flavor-imparting preparation comprising an oil containing natural butter flavor-imparting constituents and vitamin constituents equal to those occurring in at least twice its weight of raw butter fat and being free of matter non-volatile under conditions of evaporative distillation.

10. A preparation for use in cooking as a butter substitute comprising a mixture of about one part by weight of a flavor-imparting preparation comprising an oil containing natural butter flavor-imparting constituents and vitamin constituents equal to those occurring in at least thrice its weight of raw butter fat, in combination with about 2 parts by weight of a non-butter fat.

11. A new highly concentrated flavor-imparting preparation useful for replacing butter in cooking, in the form of an oil containing the essential natural flavor-imparting and vitamin content of at least ten times its weight of butter fat and free from matter non-volatile under the conditions of evaporative distillation and being freely miscible with non-butter fats.

12. Process for the manufacture of new concentrated flavoring preparations for use to replace butter in cooking which comprises subjecting water-free butter fat to evaporative short path distillation under a vacuum of the approximate order of 0.001 mm. of mercury and at a temperature of 180 to 240° C., whereby a fraction is distilled off, and recovering this fraction, while the fat is not decomposed to any substantial extent and no boiling takes place, the fraction containing in concentrated form the flavor-imparting and vitamin content of the fat.

13. In the production of improved bakery products having the flavor of cooked butter and shortened to the degree desired, the process which comprises producing a concentrated butter fat distillate carrying a latent butter flavor, by the process set forth in claim 1, and admixing the distillate with a non-butter shortening fat in such quantity as will result on baking in the development of the cooked butter flavor in correlation with the desired degree of shortening.

HEIN ISRAEL WATERMAN.
CORNELUS VAN VLODROP.